(No Model.)   3 Sheets—Sheet 1.
F. H. RICHARDS.
WEIGHING MACHINE.
No. 579,453.   Patented Mar. 23, 1897.
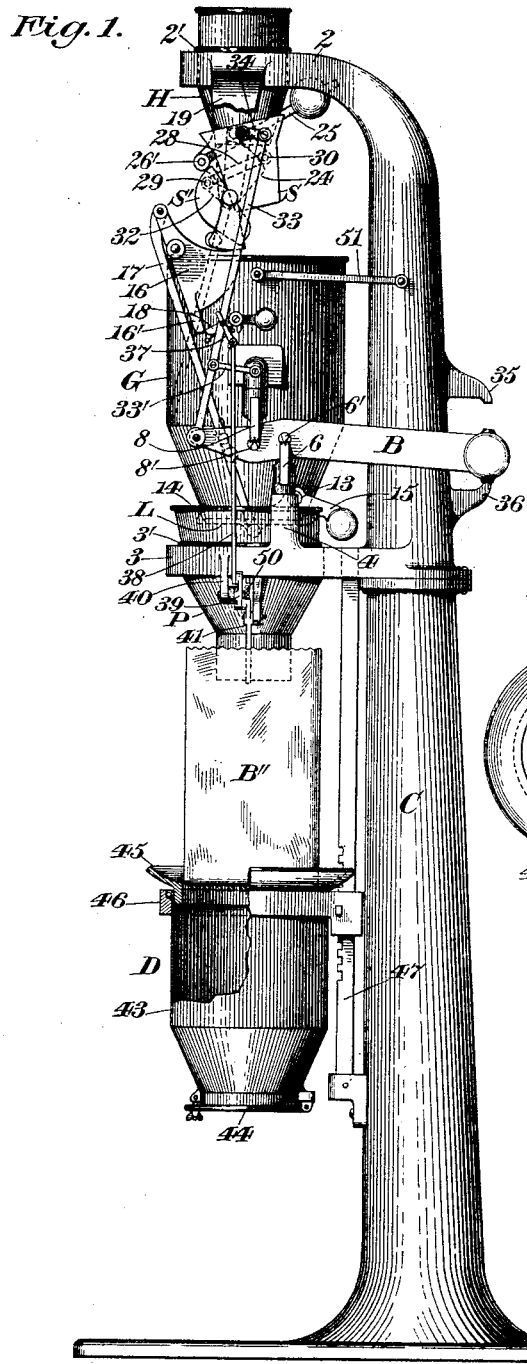
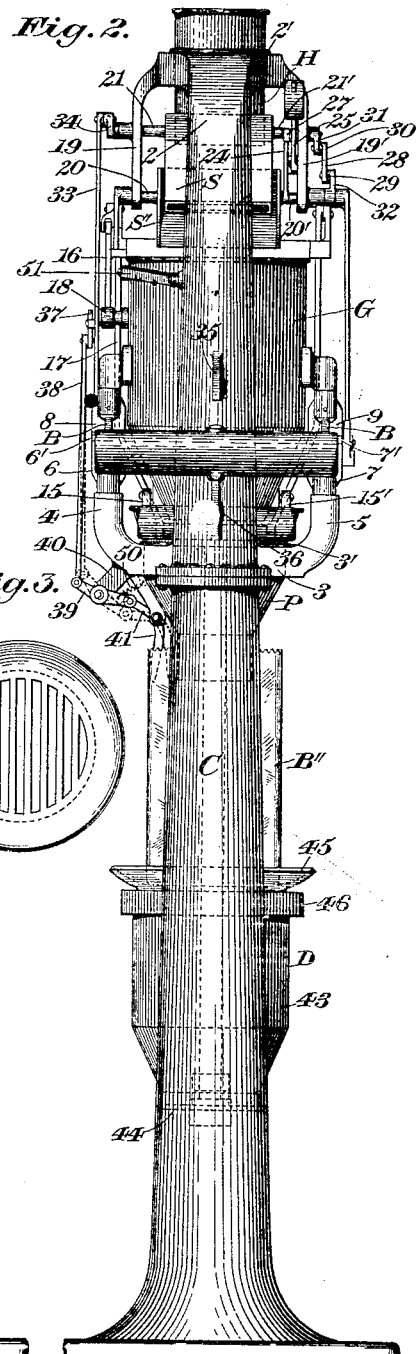
Witnesses:
O. W. Smith
Fred. J. Dole.
Inventor,
F. H. Richards.

(No Model.) 3 Sheets—Sheet 2.
F. H. RICHARDS.
WEIGHING MACHINE.
No. 579,453. Patented Mar. 23, 1897.
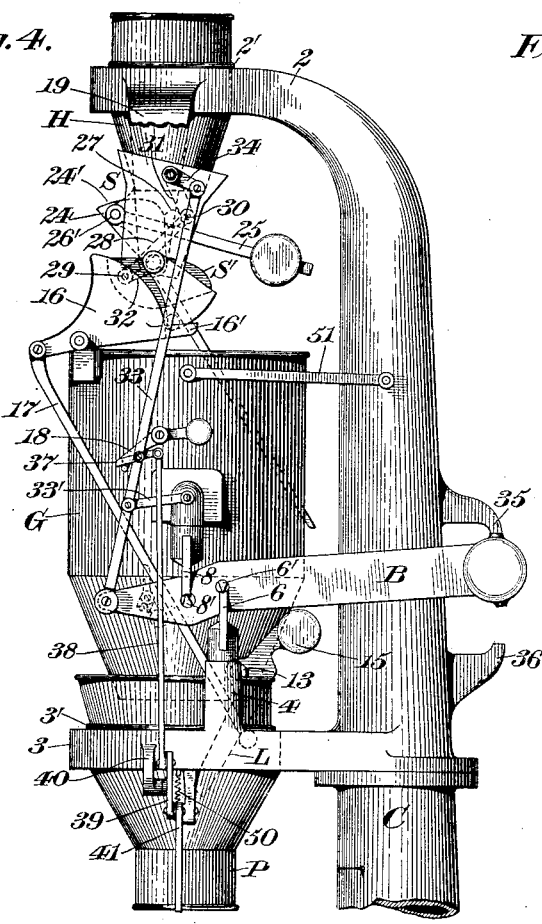
Fig. 4.
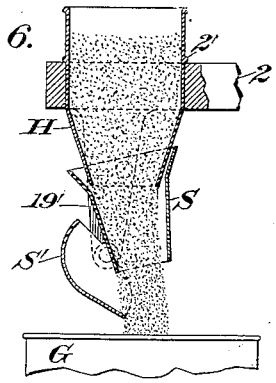
Fig. 6.
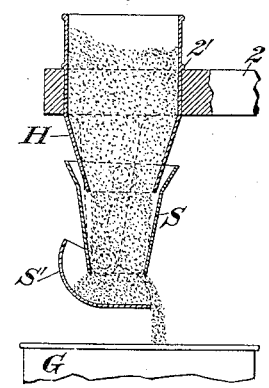
Fig. 7.
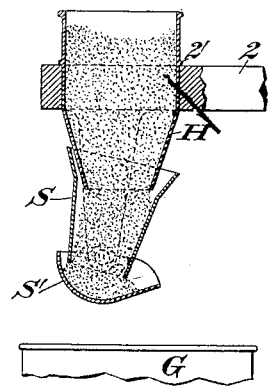
Fig. 8.
Fig. 5.
Witnesses:
O. W. Smith
Fred. J. Dole.
Inventor:
F. H. Richards.

(No Model.)  
F. H. RICHARDS.  
WEIGHING MACHINE.

No. 579,453. Patented Mar. 23, 1897.

Witnesses:  
J. L. Edwards Jr.  
Fred. J. Dole.

Inventor:  
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,453, dated March 23, 1897.

Application filed December 9, 1896. Serial No. 615,036. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to that class of automatic weighing-machines which are especially adapted for weighing such granular materials as sugar, meal, &c.

One object of this invention is to furnish a weighing-machine of the class specified which is especially adapted for use in stores where it is desired to weigh out and pack predetermined quantities of mateiral, and to so construct and organize the coöperative mechanisms of the weighing-machine that the same will be simple, durable, and effective, and whereby the stream of material may be readily controlled and said stream cut off with the minimum range of movement of the stream-controlling instrumentalities, and whereby said stream-controlling instrumentalities will be operated with reduced resistance as compared with the operation of stream-controllers in machines as heretofore constructed.

A further object of this invention is to provide, in a weighing-machine of the class specified, improved stream-controlling mechanism comprehending two operatively-connected stream-controllers pivotally supported one above the other for movement in relatively opposite directions and in different arcs, and an actuator embodying means for imparting to said stream-controllers so-called "cut-off strokes" in relatively opposite directions and having relatively different velocities at corresponding points in the length of said strokes.

Figure 9:
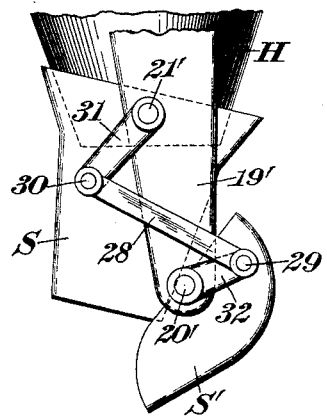
Figure 10:
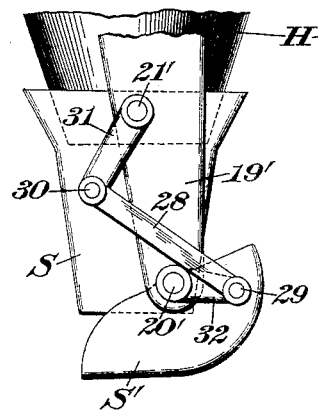
Figure 11:
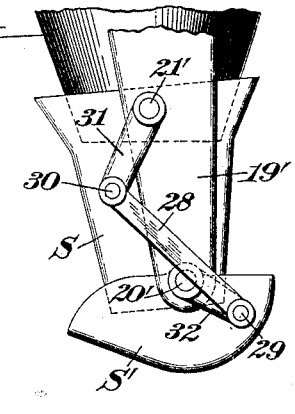
Figure 12:
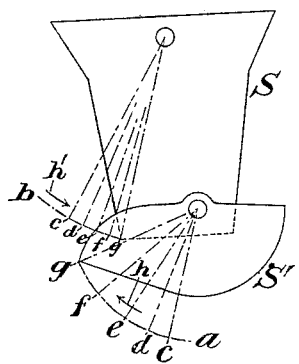

In the drawings accompanying and forming part of this specification, Figure 1 is a side elevation of a weighing-machine embodying my present improvements, said figure showing the elements of the weighing-machine in their normal positions or in the positions they occupy when material is being supplied to the load-receiver of said machine, a portion of the drip-box being broken away. Fig. 2 is a rear elevation of the machine as seen from the right hand in Fig. 1. Fig. 3 is a plan view of the removable drip-box grating removed. Fig. 4 is a view similar to Fig. 1 of a portion of the upper part of the weighing-machine on a relatively large scale, showing the stream-controllers in their cut-off positions or in the position they occupy when the load-receiver of the weighing-machine is in its overpoised position and the cut-off valve is in position to cut off the supply of material to the load-receiver. Fig. 5 is a plan view of the weighing-machine as seen from above in Fig. 4, a portion of certain of the parts thereof being broken away to more clearly illustrate other features of the machine. Fig. 6 is a longitudinal section of the stream supplying and controlling elements—to wit, the main supply chute or hopper, the cut-off valve, and the intermediate stream-controlling chute—and shows the stream-controlling chute and valve in the positions they occupy when the valve is in its fully-open position and the maximum volume of stream is being supplied to the load-receiver. Fig. 7 is a view similar to Fig. 6, showing the stream-controllers in the positions they occupy when supplying a drip-stream to the load-receiver. Fig. 8 is a view similar to Figs. 6 and 7, showing the stream-controllers in their cut-off positions. Figs. 9, 10, and 11 are side views of the two stream-controllers and a portion of the stream-supply mechanism as seen from the right hand in Fig. 2 and showing these elements in positions corresponding, respectively, with the positions thereof shown in Figs. 6, 7, and 8, said figures being intended to show the positions assumed by the actuating means during the cut-off movement of said controllers; and Fig. 12 is a diagrammatic view illustrating the path of movement and relative velocities of the two stream-controllers.

Similar characters designate like parts in all the figures of the drawings.

The framework for carrying the operative parts of the machine comprises, in the preferred form thereof shown most clearly in Figs. 1 and 2 of the drawings, a suitable column or upright, (designated in a general way by C,) which is preferably tubular and has at the upper end thereof an outwardly-extending arm or bracket 2, adapted for supporting the main supply chute or hopper H of the weighing-machine, and also having at a point considerably below the arm 2 an outwardly-extending bracket or arm 3, adapted for supporting the discharge-hopper P, uprights or supports 4 and 5 being provided on the bracket 3 at opposite sides, respectively, thereof, which carry the knife-edge bearings 6 and 7, which support the bucket-carrying beams B and B' of the weighing mechanism, said beams being located, respectively, at opposite sides of the column C, as will be understood by reference to Figs. 1, 2, and 5 of the drawings.

In the form thereof shown in the drawings the arms or brackets 2 and 3 for supporting the supply-hopper and discharge-hopper, respectively, are shown located on the column C in horizontal parallelism, and the outer ends thereof are shown in the nature of rings which encircle said hoppers, the axes of the rings being in vertical alinement.

The hoppers H and P, respectively, are shown of tubular form with conical discharge ends, and are also shown furnished with circumferential flanges 2' and 3', respectively, adapted for resting upon the upper faces of the ring portions of the brackets 2 and 3, as will be readily understood by reference to the drawings. This provides a convenient means of attachment for the hoppers. It facilitates their removal and avoids the necessity of using attaching screws or bolts for holding said hoppers in place.

The main supply hopper or chute H may, it will be obvious, be of any suitable construction for receiving the material and for delivering the same in a requisite volume to the stream-controlling elements which control the supply of said stream in its passage to the load-receiver or bucket of the weighing mechanism.

The bucket (designated in a general way by G) may be of the well-known "single-chambered" type, and it is herein shown cylindrical in cross-section and conical at its lower discharge end.

The bucket G is shown carrying a pair of V-shaped bearings or knife-edges 8 and 9, which are shown resting upon a pair of pivots or knife-edges 8' and 9', carried by the opposite counterweighted scale-beams B and B' of the beam mechanism, said scale-beams B and B' being in turn provided with a pair of knife-edges 6' and 7', which are supported upon the V-shaped bearings carried on the uprights 4 and 5 of the bracket 3.

The bucket G is shown provided at the discharge end thereof with a closer, which is designated in a general way by L and which is shown in dotted lines in Figs. 1 and 4, and which may be of any suitable general construction, said closer being pivotally supported at 13 at the lower end of the beam, near one side of the discharge-opening thereof, and consisting of a closer-plate 14, having counterweighted arms 15 and 15', adapted for returning the closer to its closed position after the contents of the bucket are discharged.

As a convenient means for supporting the bucket-closer L a rod or link 17, which constitutes one member of a toggle, is pivotally connected at its upper end to a rocker 16, which is pivotally supported on the bucket G and constitutes the other member of the toggle, the opposite end of said rod or link being pivotally connected to the bucket-closer L in such manner that when the bucket is in its normal closed position the three pivots of the toggle will be approximately in alinement and the upper pivot of the connecting-rod 17 will be above the rocker-pivot, so that said rocker, when engaged by a suitable detent device, will be held against oscillatory movement with a minimum pressure.

As a means for normally holding the rocker against oscillation a counterweighted latch 18 is shown provided, it being shown pivotally supported on the bucket G above and slightly at one side of the pivot-bearings of said bucket, the forward end of said latch being in position to engage a detent-arm, as 16', on the rocker when the closer is shut, the rocker-engaging end of said latch in the organization thereof shown in the drawings being swung upward by the counterweighted opposite end thereof to engage said rocker and being depressed to release the rocker.

The stream-controlling mechanism in the preferred construction and organization thereof shown in the drawings comprises in part two stream-controllers, (designated in a general way by S and S', respectively,) which are pivotally supported one above the other for oscillatory movement intermediate the bucket or load-receiver G and the supply chute or hopper H, the upper controller being in the nature of an oscillatory stream-diverter, the chute-valve and the lower controller being in the nature of a stream-reducing or cut-off valve.

The upper and lower stream-controllers, which may be hereinafter referred to as the "oscillatory chute" and "cut-off valve," respectively, are pivotally supported, the former above the latter, upon depending arms 19 and 19', located at opposite sides, respectively, of the hopper-supporting bracket 2, the cut-off valve having its axis near the lower discharge end of the oscillatory chute and considerably below and slightly forward of the axis of movement of said chute, so that the two controllers will be adapted to have oscillatory movements in the same plane but in different arcs.

The cut-off valve or lower stream-controller S' is shown furnished at opposite sides thereof with pivot-arms 20 and 20', which are pivotally supported in bearings near the extreme lower ends of the two depending arms 19 and 19'. This valve may be of any suitable construction, it being herein shown similar in a general way to the valve designated by 70 in Patent No. 535,738, dated March 12, 1895, to which reference may be had.

The upper stream-controller or oscillatory chute S, which is similar in a general way to the oscillatory chute described in the patent referred to, has at opposite sides thereof outwardly-extending pivot-arms 21 and 21', which are shown (see Fig. 3) pivotally supported in bearings formed in the depending arms 19 and 19' at points considerably above the bearings in which the pivots of the lower stream-controller S' are supported.

For imparting a cut-off stroke to the cut-off valve or lower stream-controller S', I have provided, in connection with said valve, a valve-closing actuator, which in the preferred form thereof shown most clearly in Figs. 1 and 4 of the drawings comprises a valve-closing cam 24, fixed to and extending upward from one of the pivot-arms of said valve, and a valve-closing lever 25, pivotally supported at 26', near the extreme forward end thereof, on a projection on one of the depending arms of the supply-hopper-supporting bracket. The valve-closing cam is shown having a cam-face 24', and the valve-closing lever will in practice be provided with a roller, as indicated by dotted lines at 27, Fig. 4, which roller will be secured to the lever in some suitable manner (not shown) at a point intermediate the pivoted and counterweighted ends thereof and in position to travel over the successive portions of the cam-face 24', said cam-face being so shaped and disposed with relation to the axis of movement of the valve that the valve-actuating lever will act with a gradually-increased force as it travels from the forward toward the rearward end of said cam-face, which force will be materially augmented after the valve has reached the drip position, (shown in Fig. 7,) so as to effect the complete closing of the valve with great rapidity.

As a means for imparting a cut-off movement of gradually-decreased velocity to the upper stream-controller S or oscillatory chute concurrently with the cut-off stroke of the lower stream-controller or valve S' the two stream-controllers are coöperatively connected together by an actuating-connector, which in the preferred form thereof herein shown is in the nature of a link 28, which is pivotally connected at opposite ends thereof, as shown at 29 and 30, respectively, to the lower stream-controller and upper stream-controller at points so located with relation to the axes of movement of the respective stream-controllers that the connector will at all times intersect a line drawn through the pivot-points of both controllers, and so that one of said stream-controllers will have a cut-off stroke of gradually-increased velocity, while the other of said stream-controllers will have a simultaneous cut-off stroke of gradually-decreased velocity. For convenience the upper and lower ends of the connecting-link 28 are pivotally connected to oppositely-disposed crank-arms 31 and 32, respectively, fixed to the pivot-arms 21' and 20' of the upper and lower stream-controllers, respectively, the upper pivotal point 30 of the link being shown located, when the stream-controllers are in their open positions, below and slightly in the rear, as shown in dotted lines in Fig. 1, of the pivotal point of the upper stream-controller, and the lower pivotal point of said link is located in advance of and considerably above the pivotal point of the lower stream-controller.

The pivotal points 29 and 30 of the connecting-link 28 are so located with relation to the axis of movement of the respective stream-controllers that during the closing or cut-off movement of the lower stream-controller or cut-off valve the lower portion of the link gradually approaches its dead-center position with relation to the axis of movement of the valve, thus decreasing the leverage and the consequent velocity imparted to the upper stream-controller through the medium of the link 28. This operation is reversed during the opening movement of the two stream-controllers, as it will be seen that the upper stream-controller has a gradually-increased velocity during the opening movement, and the lower stream-controller has a gradually-decreased velocity during such movement.

For effecting an opening movement of the valve or lower stream-controller S' means connected with the oscillatory chute or upper stream-controller will preferably be employed, the scale-beam B constituting a convenient device for transmitting the force to the valve through the medium of the upper stream-controller and the actuating-connector between said stream-controller and said valve. This actuating means consists, preferably, of a thrust-rod 33, which is pivotally connected at its upper end to a crank-arm 34, fixed to one of the pivot-arms of the oscillatory chute or upper stream-controller, the lower end of said thrust-rod being supported upon the inner or poising end of the beam B, and as a means for retaining the thrust-rod in operative relation with the beam it is pivotally connected, at a convenient point intermediate its ends, by means of a link 33', to a portion of or fixture on the bucket or load-receiver, as will be seen by reference to Figs. 1 and 4 of the drawings. The operation of the thrust-rod with relation to the oscillatory chute is substantially the same as the ordinary thrust-rod employed in connection with the main valve in automatic weighing-machines such as described in patents heretofore granted to me, it being apparent that on the ascent of the bucket G the thrust-rod will be forced upward by means of the poising end of the scale-beam, which shifts the oscillatory chute or upper stream-controller from the position shown in Fig. 4 to that shown in Fig. 1, and this movement of the oscillatory chute is transmitted to the valve S' through the medium of the actuating connector or link 28, as hereinbefore described.

As a means for limiting the throw of the counterpoising end of the scale-beam and the consequent ascending and descending movements of the bucket I have provided two oppositely-disposed stop-arms 35 and 36, which are shown formed integral with and extending outward from the rear side of the column C of the framework, the upper stop-arm limiting the descending movement of the bucket, and the lower stop-arm limiting the ascending movement of said bucket.

In connection with the latch which holds the shiftable member or bucket-closer against premature movement a suitable hand-operable actuator or load-discharging device will be employed for effecting the release of the shiftable member of the bucket mechanism to discharge the load into the discharge conduit or hopper P. This means, in the preferred form thereof shown most clearly in Figs. 1 and 4 of the drawings, comprises a latch-tripper 37, preferably pivotally carried on the thrust-rod 33, located in position to engage and throw the latch 18 out of engagement with the rocker 16; a tripper-actuating rod 38, pivotally connected at its upper end to the inner end of the latch-tripper and pivotally connected at its lower end preferably to a lever 39, (shown pivoted substantially midway its length on an arm 40 on the discharge-hopper-supporting bracket 3,) and a bell-crank 41, pivotally supported on a suitable arm preferably formed on the discharge-hopper-supporting bracket, said lever having one end thereof pivotally connected to the lever 39 and having its opposite lower end in position to be operated by hand and thrown inward, as shown in dotted lines in Fig. 2, to move the tripper-rod forward and actuate the tripper to release the latch from engagement with the rocker and thereby allow the bucket-closer to swing open, as shown in Fig. 4. This hand-operable mechanism for releasing the bucket-closer may be variously modified without departure from the present invention, and in some cases automatically-operable closer-controlling means may be employed in lieu of the hand-operable means described, although the hand-operable means is preferable for use in the class of weighing-machines having means whereby the material may be "bagged" after the same is weighed.

As a means for facilitating the bagging of the weighed material I have provided, in connection with the framework of the machine, a bag-supporting apparatus which in the preferred form thereof shown is in the nature of a cylindrical conically-ended drip-box, (designated in a general way by D,) which is adjustably supported below the discharge conduit or hopper P, said drip-box, in the preferred form thereof herein shown most clearly in Fig. 1 of the drawings, comprising a tubular body portion 43, having a conical discharge end provided with a cut-off gate or closer 44 and a bag-supporting grate or cover 45, removably seated in the upper end of said body portion and in position to support a bag, such as B'', with its receiving end surrounding the discharge end of the discharge hopper or conduit P.

As a means for adjustably supporting the drip-box D, I have provided a recessed box-supporting bracket 46, the inner end of which is adjustably supported on a vertically-disposed guide-bar 47, supported on the lower portion of the column C of the framework, with its longitudinal axis in parallelism with the longitudinal axis of the column C and the coincident axes of the main supply-hopper, bucket-discharge hopper, and drip-box.

For the purpose of concentrating the applied forces due to the flow of material and to the weight of the supply-hopper, bucket, discharge-hopper, and drip-box the longitudinal axes of these several parts are substantially coincident and in parallelism with the longitudinal axis of the supporting-column C, and it will be further seen that the pivots for the scale-beams which support the bucket are also in alinement in the vertical plane of the axes of the supply-hopper, bucket, discharge-hopper, and drip-box, which are located one below the other in the respective order named.

The weighing operation of the weighing-machine may proceed uninterrupted while the bag is being filled with the material discharged from the bucket G, through the discharge-conduit P, into said bag. In the interim which ensues between the discharge of a predetermined bucket-load and the completion of a succeeding bucket-load the operator may shake and pack the contents of the bag to any extent without interfering with the weighing operation, and afterward the filled bag may be removed and another bag placed in position for receiving the succeeding bucket-load.

The latch-tripping mechanism after being released will immediately return to the normal position thereof (shown in Fig. 1) by means of a retracting device, such as the spring 50, in connection with the lever 39.

Interlocking mechanism is employed for preventing a premature opening and closing movement of the bucket-closer and a premature opening and closing movement of the valve of the stream-controllers, which interlocking mechanism may be substantially the same as like mechanism in weighing-machines described in patents heretofore granted to me.

For holding the bucket with its longitudinal axis in vertical alinement during the reciprocatory movement thereof said bucket is connected at its upper end with the column C by means of a link 51, which is pivotally connected at one end to said bucket and at its opposite end to said column.

In Fig. 12 I have illustrated in diagram the relative paths and velocities of the two stream-controllers, the arcs $a$ and $b$ representing, respectively, the paths of movement of the discharge-opening of the valve, and the forward point of the oscillatory chute and the radial lines (designated by $c$, $d$, $e$, $f$, and $g$) indicating the successive distances traversed in opposite directions, respectively, in equal lengths of time by these points $a$ and $b$ of the two stream-controllers. By reference to this diagrammatic figure it will be seen that the lower stream-controller has a cut-off stroke in the direction of the arrow (designated by $h$) of gradually-increasing velocity, whereas the upper stream-controller has a cut-off stroke in an opposite direction (designated by the arrow $h'$) of gradually-decreasing velocity, and vice versa.

Having described my invention, I claim—

1. In a weighing-machine, the combination, with a suitable frame and with a load-receiver and stream-supply means, of two oscillatory stream-controllers having outwardly-extending pivot-arms supported in the frame, one above the other and below the stream-supply means; a crank-arm carried on the upper pivot-arm, with its outer end below and in advance of said arm; a crank-arm carried on the lower pivot-arm, with its outer end in the rear of said lower arm; a link pivotally connecting the two crank-arms and having its longitudinal axis intersecting a line drawn through the upper and lower pivot-arms; and means for actuating one stream-controller whereby opposing movements of gradually-increasing and gradually-decreasing velocities, respectively, are simultaneously imparted to the two stream-controllers.

2. In a weighing-machine, the combination; of a frame comprising a tubular column having a suitable supporting-base and having two outwardly-extending parallel supporting-brackets, the outer ends of which are recessed to form hopper-encircling rings; a supply-hopper extending through the recess of the upper bracket and peripherally flanged for supporting said hopper on said bracket; a discharge-hopper having its discharge end projected through the recess of the lower bracket and having a peripheral flange for supporting said hopper on said bracket; weighing mechanism interposed between the two hoppers and including a reciprocatory bucket; a scale-beam supported on the framework; and stop-arms located on the column one above the other in position for engaging and limiting the movements of the scale-beam.

3. The combination, with a vertically-disposed column having a suitable base and having outwardly-extending horizontally-disposed brackets located one above the other, of a supply-hopper supported on the upper bracket; a discharge-hopper supported on the lower bracket; weighing mechanism embodying a reciprocatory bucket located between the two hoppers; a bag-supporting drip-box located below the discharge-hopper, with its axis in vertical alinement with the axes of the discharge-hopper, bucket, and supply-hopper, and in parallelism with the longitudinal axis of the vertical column.

4. In a weighing-machine, the combination, with a suitable frame and with weighing mechanism including a reciprocatory bucket; of a supply-hopper and a discharge-hopper located the former above, and the latter below, the bucket, with their axes in alinement with the axis of said bucket; a bag-supporting drip-box located below the discharge-hopper and having at the lower end thereof a closer and at the upper end thereof a removable bag-supporting grate; and adjusting and supporting means for said drip-box.

5. In a weighing-machine, a framework for supporting the operative mechanism, comprising a vertical column having two horizontally-disposed hopper-supporting brackets located one above the other; scale-beam-supporting bearings located on the lower bracket, one at each side thereof; and oppositely-disposed scale-beam stops located on the column.

FRANCIS H. RICHARDS.

Witnesses:
FRED. J. DOLE,
F. N. CHASE.